Figure 5:
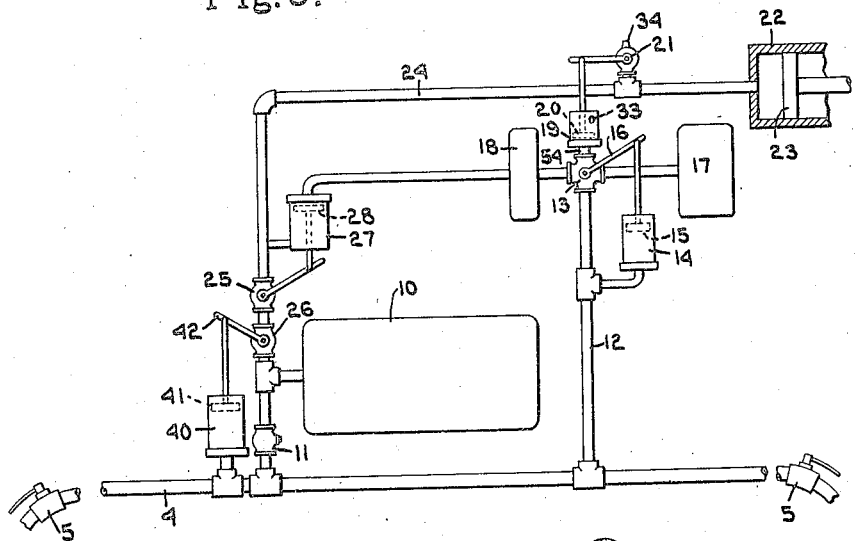

Aug. 14, 1923.
G. D. BRECK ET AL
AIR BRAKE
Filed March 31, 1921      5 Sheets-Sheet 1
1,464,640
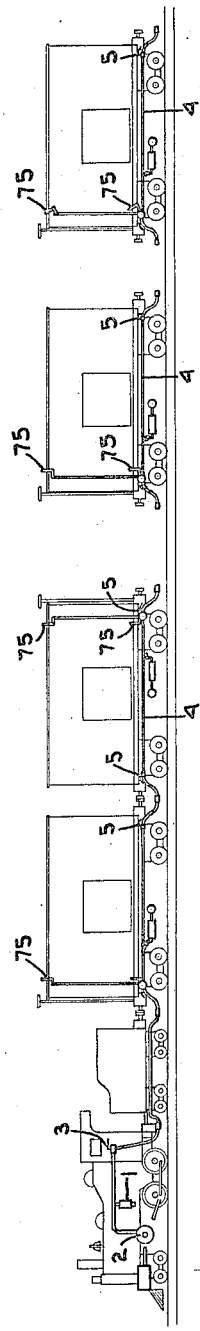
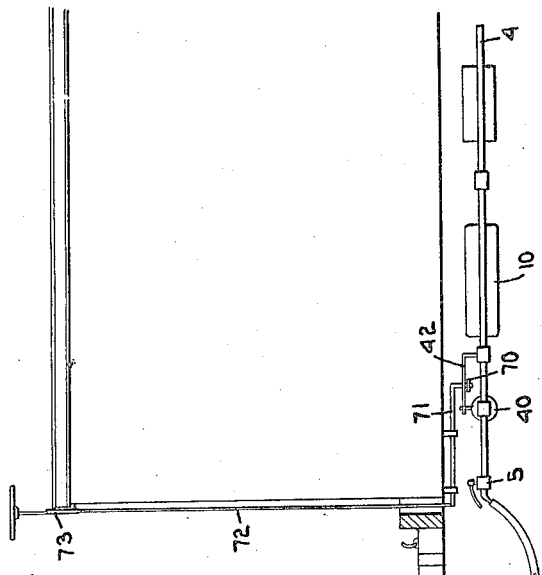
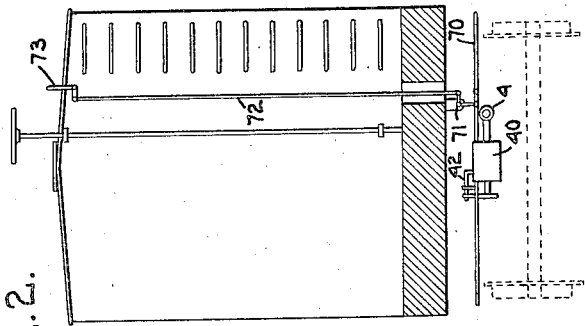
George D. Breck
Lawrence W. Breck
John Schmauss
INVENTORS.
BY
ATTORNEY.

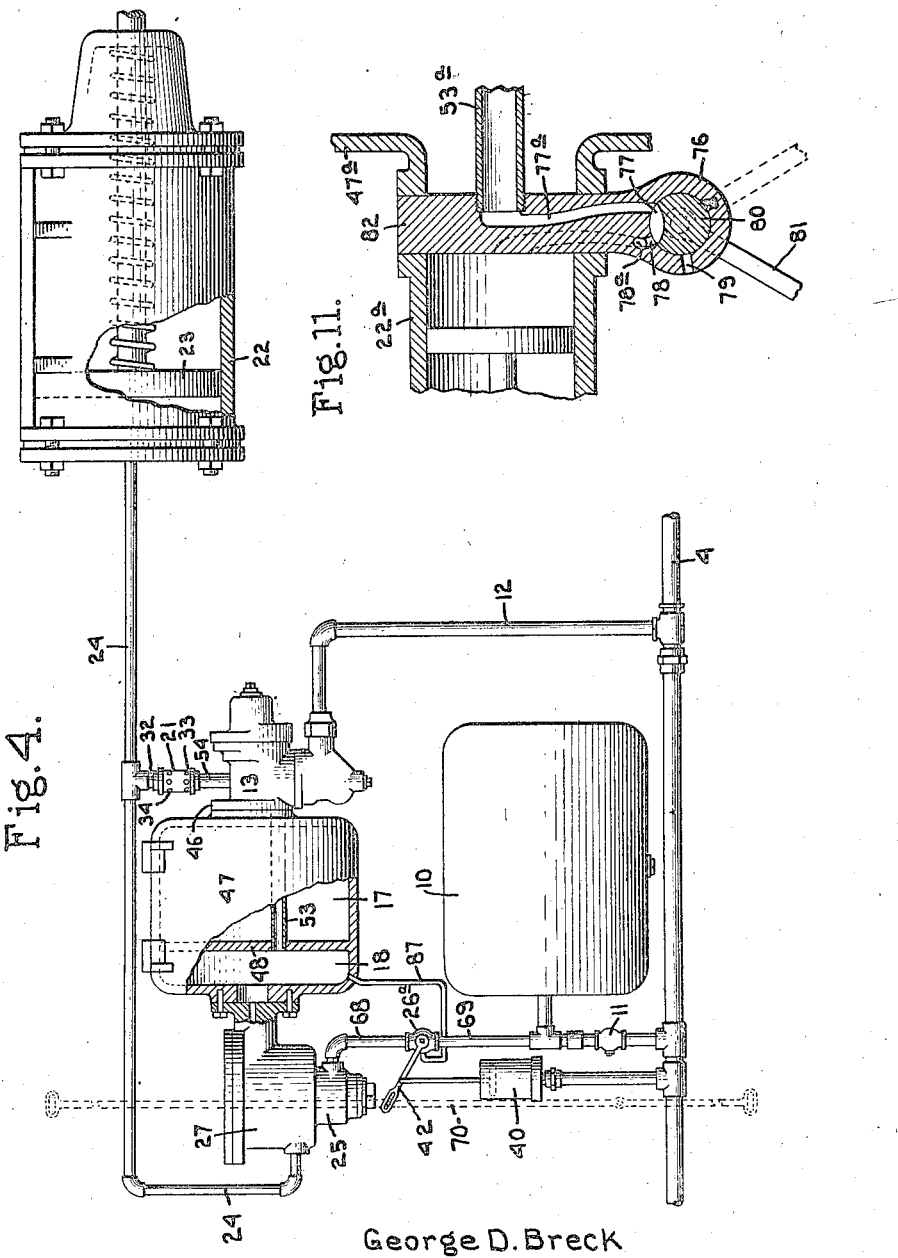

Aug. 14, 1923.

G. D. BRECK ET AL 1,464,640

AIR BRAKE

Filed March 31, 1921   5 Sheets-Sheet 3

George D. Breck
Lawrence W. Breck
John Schmauss

INVENTORS.

BY
Harold Elmo Smith   ATTORNEY.

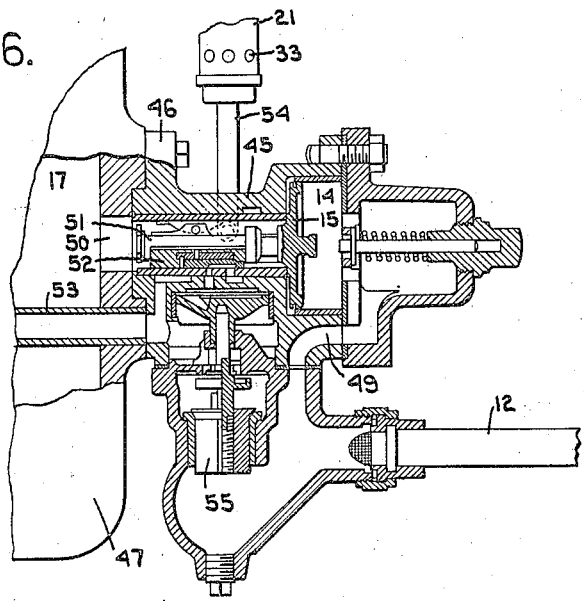
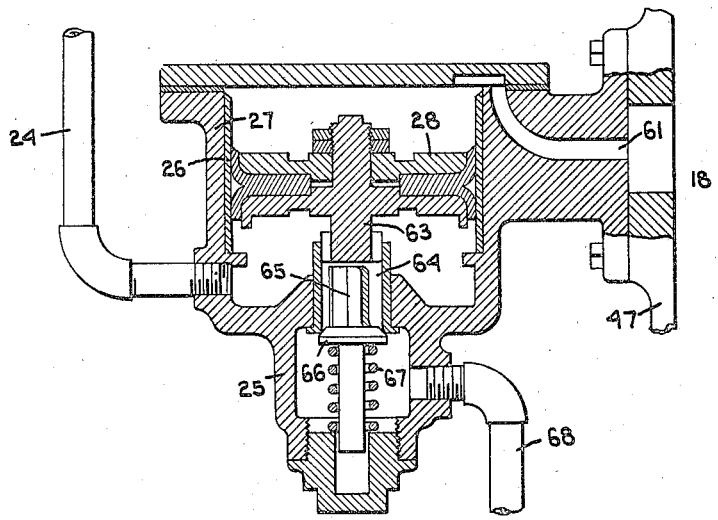

Aug. 14, 1923.

G. D. BRECK ET AL

AIR BRAKE

Filed March 31, 1921

1,464,640

5 Sheets—Sheet 5

George D. Breck
Lawrence W. Breck
John Schmauss

INVENTORS.

BY

*Harold Elmo Smith* ATTORNEY.

Patented Aug. 14, 1923.

1,464,640

UNITED STATES PATENT OFFICE.

GEORGE D. BRECK, OF CLEVELAND, OHIO, AND LAWRENCE W. BRECK AND JOHN SCHMAUSS, OF BUFFALO, NEW YORK.

AIR BRAKE.

Application filed March 31, 1921. Serial No. 457,406.

*To all whom it may concern:*

Be it known that we, GEORGE D. BRECK, residing at Cleveland, in the county of Cuyahoga and State of Ohio, and LAWRENCE W. BRECK and JOHN SCHMAUSS, residing at Buffalo, in the county of Erie and State of New York, all citizens of the United States, have invented certain new and useful Improvements in Air Brakes, of which the following is a full, clear, and exact description.

This invention relates to air brakes such as are employed for controlling the operation of railroad trains, and has special reference to air brake equipment for freight train use, though not limited thereto. According to the usual practice, the air brake system comprises a reservoir, pump, and controlling valve (engineer's valve) upon the locomotive; a reservoir, brake-cylinder, and controlling valve (triple valve) on each car; and a train pipe connecting all these parts. While the engineer's valve is in one position, the air compressed by the pump into the reservoir passes through the train pipe and fills all the different car-reservoirs, meanwhile holding the triple valves in such a position as not to operate the brake-cylinder; but upon turning the engineer's valve to another position the train pipe is disconnected from the locomotive reservoir and opened to the atmosphere, whereupon the triple valves are automatically actuated to connect each car reservoir to its corresponding brake-cylinder and the train brakes are applied. The same result follows the accidental bursting or uncoupling of the train pipe, and the brakes on the various cars remain set until the pressure is restored in the train pipe, which automatically restores the triple valves to running position and releases the pressure in the cylinder, or until the pressure in the various car reservoirs becomes dissipated by accidental or intentional leakage.

Thus before switching the cars in a yard it is necessary for a brakeman or yardman to visit every car and release all the air contained therein by means of a valve provided for that purpose, after which the car can be controlled only by the hand brakes; thereby necessitating that a yardman climb upon it and set the brake to stop it, and climb upon it a second time to release the brake the next time the car is to be shifted. Furthermore when the cars are next collected into a train it is necessary to recharge all the individual car reservoirs to the working pressure before the cars can be moved either legally or with safety, which in the case of a long train involves considerable delay. And finally under the conditions existing with the usual freight car the air leakage is so rapid as to cause a loosening of the brakes within a few minutes or hours for this cause alone which is a distinct source of accidents by reason of trains getting out of control on grades.

The objects of this invention are the provision of an air brake system wherein the brakes can be released on the individual cars without emptying the reservoirs on those cars; wherein the brakes on the individual cars can be repeatedly applied and released during the time that such cars are disconnected from the locomotive; the provision of mechanism forming a part of such system whereby such individual operation is prevented during the time that the cars are connected to locomotives and the control of their air brake system restored to and held firmly under the jurisdiction of the engineer; the provision of a new and improved mechanism for maintaining a uniform and sufficient working pressure on the brake during a much greater length of time than heretofore; the provision of mechanism fulfilling the above mentioned objects which shall be cheap and simple in construction, and identical in its operation with the operation of the standard mechanism, so that a train will be entirely workable when equipped only partly with our improvements; while further objects and advantages of the invention will become apparent as the description proceeds.

Figure 8:
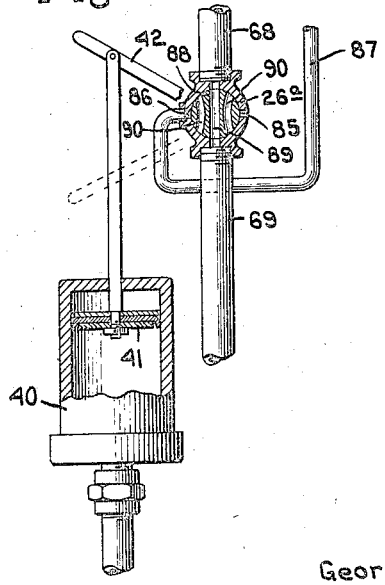
Figure 9:
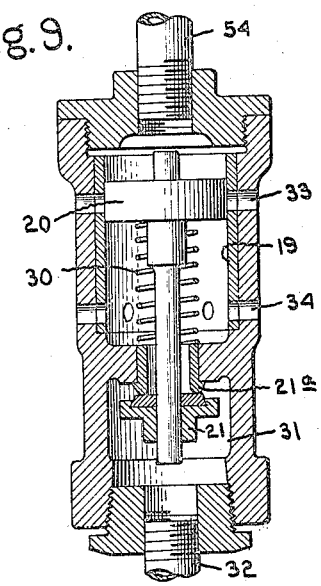
Figure 10:
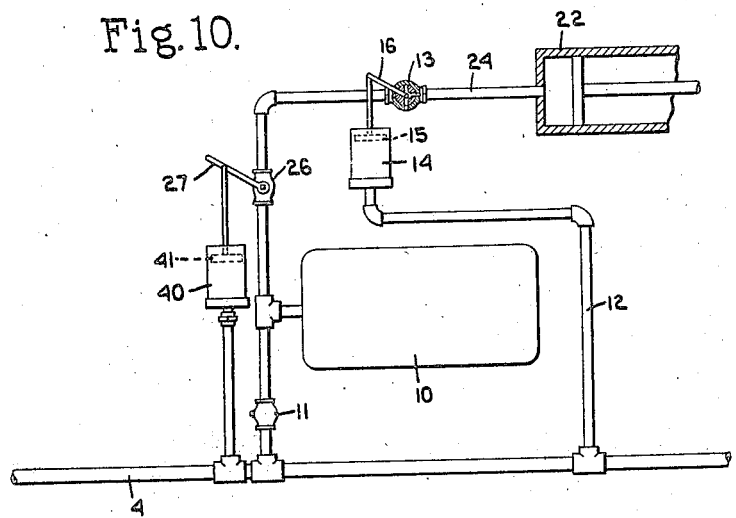
Figure 12:
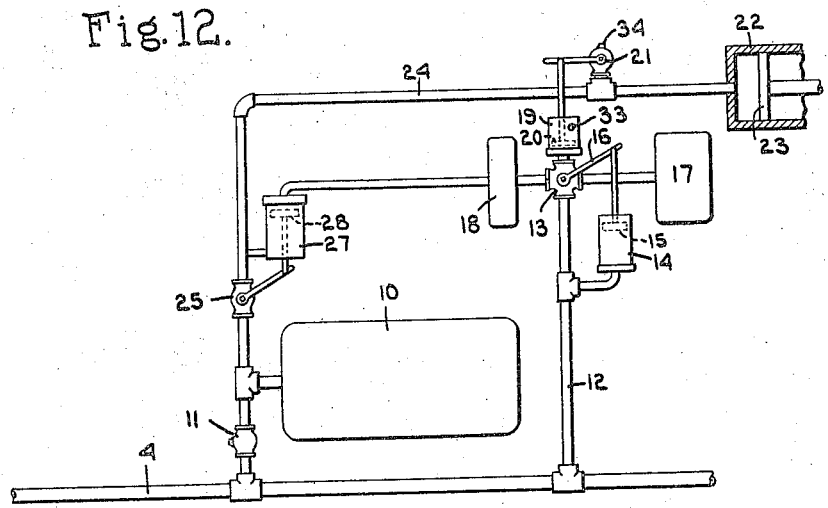

In the drawings accompanying and forming a part of this application we have shown, both diagrammatically and illustratively, certain embodiments of our inventive idea, although without intent to limit ourselves to any features of construction except as the same are specifically set forth in our claims, for the reason that great changes can be made in all matters of detail. In these drawings Fig. 1 is a diagrammatic view of a part of a freight train equipped with our improved air brake; Fig. 2 is an end view and Fig. 3 a side elevation of a freight car provided with a preferred form of our improvement; Fig. 4 is a top plan view of the brake mechanism illustrated in Figs. 2 and 3, taken immediately beneath the floor of the car and looking downwardly; Fig. 5 is a diagrammatic view illustrating the functions of the parts present in Fig. 4; Fig. 6 is a detail view of the triple-valve drawn to enlarged scale; Fig. 7 is a detail view of the maintaining valve drawn to enlarged scale; Fig. 8 is a detail view of the release valve and its control piston; Fig. 9 is a detail view of the cylinder discharge; Fig. 10 is a diagrammatic view illustrating the essential features of a simpler system embodying only a part of the advantages heretofore enumerated; Fig. 11 illustrated our improved releasing valve as applied to the standard car brake; and Fig. 12 is a diagrammatic view of another simplified system presenting other partial advantages.

Describing by reference characters the parts shown in the drawings, 1 represents the air pump or compressor, 2 the locomotive-reservoir, and 3 the engineer's valve. 4 represents the train pipe which consists of rigid sections carried by the cars and flexible sections between the cars, and 5—5 represent the angle cocks which are carried at the junction of each rigid and flexible section. We will first describe the diagrammatic system of Fig. 5 after which the more complicated construction of Figs. 4, 6, 7, 8, and 9 will immediately become clear. The same reference characters are employed in all these views.

10 represents a storage reservoir of considerable size which is connected to the train pipe 4 by way of a check valve 11 so arranged that air can flow into the reservoir from the train pipe but cannot escape in the reverse direction. Independently connected to the train pipe by the pipe 12 is the triple valve 13 with which is associated a cylinder 14 having therein a piston 15 suitably connected to the operating member 16 of said valve. 17 and 18 denote a pair of pressure chambers connected to the triple valve and having capacities in the ratio of 2½ to 1, and also connected to the triple valve is a cylinder 19 having therein a piston 20 connected to a valve 21. 22 denotes the brake cylinder having therein the piston 23 which when advanced applies the brakes (not shown) and 24 denotes a pipe which connects that cylinder to the valve 21 and also by way of a shut-off valve 25 and three-way valve 26 to the supply reservoir 10. 27 denotes a cylinder having one end connected to the pipe 24 and the other end connected to the chamber 18; and 28 denotes a piston fitting tightly in said cylinder and operatively connected to the valve 25 so that whenever the pressure in the chamber is above that in the pipe 24 the valve 25 will be opened. 40 denotes a cylinder communicating freely with the train pipe 4 and having therein a piston 41 connected with the handle 42 of the valve 26, the parts being so arranged that when the piston 41 is advanced the passage through the valve is opened and the waste passage closed, and when said piston is retracted the main passage is closed and the side branch opened.

We will now describe briefly the intended operation of the parts shown in Fig. 5 after which we will describe the detail construction of the illustrative embodiment and show the manner of its practical application. First, assuming the locomotive to be connected to the train pipe and the pressure therein to be the normal working pressure of 70 pounds per square inch. The reservoir 10 will therefore be fully charged, the piston 41 will be advanced so as rigidly to hold the valve 26 open, and the piston 15 will be advanced so as to hold the triple valve in running position, the pipe 12 being in free communication with the chamber 17, and the chamber 18 open to the atmosphere, and therefore empty of pressure for which reason the cylinder 22 is also empty of pressure. If now the pressure in the train pipe is decreased, either accidentally or intentionally, the first effect is to permit the retraction of the piston 15 of the triple valve which serves to disconnect the chamber 17 from the train pipe and connect it to the chamber 18, whereupon the unbalanced pressure above the piston 28 opens the valve 25 and allows air from the reservoir 10 to flow into the cylinder 22, thereby advancing the piston 23 and setting the brake. The valve 25 remains open until the pressure in the brake cylinder, and therefore in the bottom of the cylinder 27, becomes sufficiently high to restore the piston 28 to its initial position and close the valve 25. No reasonable amount of leakage in the brake cylinder can release the brake for the reason that the only result of a decrease in pressure so produced is to cause an opening of the valve 25, and an admission of more air from the reservoir 10, thereby maintaining the pressure on the brake until the reservoir 10 has become exhausted, which requires a long time since there is no necessary limit to the size of this reservoir. In the usual car brake system the size of this reservoir is strictly limited by the requirement that it be only 2½ times the volume of the brake cylinder in order to effect an equal application of the brakes on all cars, but in our system this condition is met by making the chambers 17 and 18 of the prescribed ratio, thereby enabling the adoption of any desired ratio between the sizes of the brake cylinder and its supply reservoir.

If now the air pressure be restored to the train pipe 4, its first effect is to restore the piston 15 to the position shown in the diagram whereby the pipe 12 is reconnected to the chamber 17 and the chamber 18 is connected to the cylinder 19, thereby advancing the piston 20 and opening the discharge valve 21. The air in the brake cylinder is thus allowed to escape freely to the atmosphere, while the advance of the piston 20 uncovers a hole 33 which allows the escape of the air contained in the chamber 18. Inasmuch as the pressure falls simultaneously on both sides of the piston 28, no change takes place in the position of the latter and the valve 25 remains closed, but the decrease in pressure in the reservoir 10 is restored by way of the check valve 11.

Supposing that the car containing this system is disconnected from the rest of the train, leaving the angle cocks open so that the pressure in the train pipe 4 falls to atmospheric pressure. The first effect will be to set the brake as heretofore described, but to release such brake it is only necessary to move the valve 26 to discharging position whereupon the air in the cylinder 22 will be released without any loss whatever of air from the receptacles 10, 17 or 18; it being understood that the valve 25 is one which will open automatically to an unbalanced pressure in this direction; and if the brakeman desires to reset the brakes he has only to restore the handle 42 to its original position, whereupon the brakes will be reset by air from the reservoir 10 to the exact pressure determined by the ratio of 17 to 18 which has not been varied in the interim.

Finally when the car is again connected to the locomotive and the pressure in the train pipe is restored, its first effect is to reset the valve 26 to running position, in case the yardman may have left it otherwise, and to hold it firmly in such position so that the train is under the sole control of the engineer; and the car is ready to be moved immediately without any attention on the part of the brakeman.

The triple valve which is shown in enlarged section in Fig. 6 is of the standard or any approved type, and one of the advantages of our invention is that the usual valve is employed. This comprises a cylinder 14 in one end of a cast iron body 45 whose opposite end has an attaching flange 46 by which it is ordinarily secured to the car reservoir, but is here attached to the divided reservoir 47 which is formed with a partition 48 defining the chambers 17 and 18. One face of the piston 15 is acted upon by the pressure in the pipe 12 conveyed thereto by way of the duct 49, and the other face is acted upon by the pressure in the chamber 17 acting through the hole 50. The stem 51 of this piston serves to move a valve block 52 in such wise as to open and close various ports, the particular relation and construction of the same being unimportant to the present invention except for the following relationships: that with the parts in the position shown in Fig. 6 the pipe 12 must be in free communication with the chamber 17, and the pipe 53 in free communication with the pipe 54; and upon a movement of the piston 15 to the right the pipes 12 and 54 must both be cut off and communication established between the chamber 17 and pipe 53. In the ordinary air brake system the brake cylinder is connected to the opposite end of the reservoir 47 and the pipe 53 leads immediately thereto, the partition 48 being omitted.

55 in Fig. 6 represents the emergency valve which responds to an unduly quick reduction of pressure in the train pipe and sets the brake with increased force, this operation being the same in our improved system as in the standard system.

The maintaining valve 27 is illustrated in detail in Fig. 7 and comprises essentially a casting secured to the end of the reservoir 47 and formed with a cylinder 27 therein communicating at one end with the chamber 18 by means of the duct 61 and at the other end with the brake cylinder 22 by way of the pipe 24. Movably mounted in this cylinder is a closely fitting piston 28 having a depending stem 63 formed at its lower end to engage the fingers 64 which traverse the valve seat 65 and project from the face of the poppet valve 66 which is normally held seated by the spring 67. The lower side of this valve communicates with the relief valve 26 by way of the pipe 68. With this construction the valve 66 will be unseated upon the existence of an unbalanced pressure tending to depress the piston, thereby admitting air from the pipe 68 until this pressure is equalized and the brake has been applied by a corresponding amount; and also upon the opening of the valve 26 the air in the brake cylinder is permitted to escape in the reverse direction merely by overcoming the tension of the spring 67.

In the diagrammatic arrangement shown in Fig. 5 the valve 26 consists of a mere three way cock so connected to the piston 41 that when the piston is depressed the side of the valve which is turned away from the reservoir 10 will be vented to the atmosphere. This construction is entirely operative and is sufficient for most purposes, although, as heretofore pointed out, the repeated application of the brakes depends upon the continued maintenance of pressure in the chamber 18, but if by reason of leakage this pressure be dissipated it is no longer possible to reset the brakes. To avoid this difficulty we have shown an additional feature in Figs. 4 and 8, the valve body $26^a$ having opposed ports 85 and 86 in its side walls, the port 85 opening to the atmosphere and the port 86 being connected to the chamber 18 by a pipe 87. The valve member 88 has a through-passage 89 adapted to connect together the pipes 68 and 69 when the handle 42 is in the full-line position and two additional passageways 90—90 operative when said handle 42 is moved to dotted line position, the one to connect the pipe 68 to the port 85 whereby the brake cylinder is evacuated and the other to connect the pipe 69 to the chamber 18 whereby any pressure loss therein is restored.

The cylinder-release valve is shown in inverted position in Fig. 9 and comprises essentially a cylinder 19 having the pipe 54 screwed in one end and having in its opposite end the valve seat 21$^a$. Movably mounted in this cylinder is the piston 20 having secured to its stem the valve 21 which closes this seat but is normally held lightly thereagainst by the spring 30. This valve 21 is contained in the chamber 31 which communicates by means of a pipe 32 with the pipe 24 and hence with the brake cylinder. The sides of the cylinder 19 are formed with apertures 33 normally closed by the piston 20 and with other escape openings 34 for the escaping air. When the air in the chamber 18 is allowed to escape by the triple valve through the pipe 54 the piston 20 is moved so as to uncover the parts 33 and simultaneously to unseat the valve 21, permitting the air from the brake cylinder to escape by way of the ports 34.

In order to permit the convenient operation of the valve 26 I have shown a slide bar 70 located horizontally beneath the car floor and projecting from side to side thereof so as to be operable from either side of the track, this bar having a pin and slot connection with the handle 42 of said valve. We have also shown a rock shaft 71 operatively connected with this bar and articulated to a drag link 72 running to the top of the car where it is provided with an operating lever 73 whereby the valve may be operated from this point also. These parts are illustrated diagrammatically at 75—75 in Fig. 1 wherein it is indicated that so long as the pressure is maintained in the train pipe these devices cannot be moved, but as soon as this pressure is released, the car brakes can be manipulated locally either from the ground or from the car.

In Fig. 10 we have illustrated a simplified brake mechanism, omitting the maintaining valve features and employing only the releasing valve features in addition to the parts commonly employed at the present day. In this construction 10 represents the car reservoir which, as before, is supplied with air by way of the check valve 11 and 13 represents a simplified triple valve which is merely a three-way valve as its name implies, here represented as a common three way cock interposed in the connection 24 which leads from the reservoir 10 to the brake cylinder 22. A second three way cock 26 is interposed in this connection, having its operating handle 27, connected to the piston 41 of the cylinder 40 as before. It will be understood that the upper end of the cylinder 14 constitutes an air chamber so that upon reduction of pressure in the pipe 12 the expansion of the air above the piston serves to depress the same as in the standard type of triple valve, thereby opening the passage through the pipe 24.

The operation of this simplified device is substantially the same as of the system heretofore described, namely: when the train pipe 4 is filled with air at high pressure, the reservoir 10 is likewise filled, and the cylinders 14 and 40, being under maximum pressure, their pistons are held in the position shown. Upon an accidental or intentional reduction of pressure in the pipe 4 the piston 15 is depressed, opening the valve 13 and permitting air to flow from the reservoir 10 to the brake cylinder 22; upon a restoration of pressure in the pipe 4 the piston 15 retakes its former position, moving the valve 13 so as to vent the cylinder 22 to the atmosphere. If the car be disconnected from the locomotive, leaving the pipe 4 open to the atmosphere, the piston 15 moves to such a position as to establish open communication through the pipe 24, after which the brake can be manipulated by means of the valve 26, which is now freely movable owing to the absence of any pressure in the cylinder 40.

In Fig. 11 we have shown a mode of applying this releasing valve to the usual type of air brake system wherein 47$^a$ represents the car reservoir, 22$^a$ the brake cylinder, and 53$^a$ the pipe leading from the triple valve to said cylinder. 82 indicates a block which is interposed between the cylinder and reservoir for the purpose of securing the necessary space for the ducts required, said block having at one side an extension formed with a valve seat 76 having three ports therein, 77—78 and 79. The port 77 communicates with the pipe 53$^a$ by a duct 77$^a$; the port 78 communicates with the cylinder by way of the duct 78$^a$; and the port 79 opens directly into the atmosphere. Located in this seat 76 is the valve member 80 having a passageway therein adapted when the valve is turned in one direction to connect ports 77 and 78 and when turned in another position to connect ports 78 and 79. Preferably the handle 81 of this valve is connected to a control piston of the type heretofore shown, although even this is not imperative. In this illustrative drawing the function of the check valve 11 represented in Fig. 10 is included in that of the triple valve (not shown).

In Fig. 12 we have shown a diagram of an air brake apparatus similar in every respect to that illustrated in Fig. 5 excepting for the omission of any releasing valve, and the same will be understood without special description.

It will be understood that our invention may be embodied in a great number of physical forms in addition to those herein illustrated and that we limit ourselves in no wise except as specifically set forth in the annexed claims.

Having thus described our invention what we claim is:

1. In an air brake system for freight cars, the combination with a supply reservoir, a brake cylinder, and a conduit connecting them, of a pair of three way valves operatively associated with said conduit, one after the other and each adapted either to open a passage through said conduit or to close such passage and vent to the atmosphere the portion of the conduit which is farthest from said reservoir whereby when both valves are open the brake will be applied and when either is closed the brake will be released, one of said valves being manually operated and the other being automatically operated in accordance with the pressure in the train pipe.

2. In an air brake system for freight cars, the combination with a train pipe, a pressure reservoir, and a brake cylinder, of a conduit connecting said reservoir and cylinder, a pair of three way valves operatively associated with said conduit at different points and each adapted either to open a passage therethrough or to close such passage and vent to the atmosphere that portion of the conduit which is nearer the brake cylinder, a pair of cylinders independently connected to said train pipe, and pistons in said cylinder connected to said valves, one of said pistons holding its valve closed when the pressure in said train pipe is high and the other holding its valve open when pressure exists in said train pipe.

3. In an air brake system, in combination, a train pipe, a pressure reservoir, a brake cylinder, and two valves interposed between said reservoir and cylinder adapted either to admit air from said reservoir to said cylinder or to discharge air from said cylinder independently of said reservoir, one of said valves being operable automatically in accordance with the train pipe pressure, the other being operable manually, and means for preventing operation of said last valve so long as any pressure exists in the train pipe.

4. In an air brake system, the combination with a train pipe, a pressure-reservoir, a brake cylinder, and a triple valve adapted to control the flow of air to and from said cylinder in accordance with the train pipe pressure, of an independent, manually operated valve adapted to permit the escape of air from said cylinder without releasing that in said reservoir, and means including a cylinder and piston for holding said last valve in inoperative position whenever pressure exsts in said train pipe above that of the atmosphere.

5. The combination with the train pipe, of a pressure-reservoir connected thereto, such connection including a non-return check valve, a brake cylinder, a connection between said reservoir and cylinder, including a three way valve, and a pressure actuated controlling device also interposed in the connection between said reservoir and cylinder and independently connected to the train pipe.

6. In a railroad train, the combination with a locomotive having an air pump, reservoir and engineer's valve, of a plurality of cars each having an auxiliary reservoir, a brake cylinder, and a triple valve, a train pipe connecting said engineer's valve with all said triple valves, a three way valve on each car located between the corresponding reservoir and cylinder and adapted to connect said cylinder either with the reservoir or with the atmosphere, and means for operating said last mentioned valve from the ground or from the body of the car.

7. In a railroad train, the combination with a locomotive having an air pump, reservoir and engineer's valve, of a plurality of cars each having an auxiliary reservoir, a brake cylinder, and a triple valve, a train pipe connecting said engineer's valve with all said triple valves, a three way valve on each car located between the corresponding reservoir and cylinder and adapted to connect said cylinder either with the reservoir or with the atmosphere, and means operable from the locomotive for rendering said three way valves inoperative.

8. In a railroad train, the combination with a locomotive having an air pump, reservoir and engineer's valve, of a plurality of cars each having an auxiliary reservoir, a brake cylinder, and a triple valve, a train pipe connecting said engineer's valve with all said triple valves, a three way valve on each car located between the corresponding reservoir and cylinder and adapted to connect said cylinder either with the reservoir or with the atmosphere, and pressure operative means connected to said valve and to the train pipe adapted to hold said valve in inoperative position when pressure exists in said train pipe.

9. In an air brake system for freight cars, in combination, a pressure reservoir and a brake cylinder carried by each car, a train pipe connecting all said cars, pressure operated valves connected to said train pipe and adapted to control the charging of said reservoirs and the operation of said brakes, valves additional to said pressure operated valves adapted to enable manipulation of said brakes, means for actuating said last valves from a plurality of points about the car, and means connected to the train pipe adapted to prevent movement of said valves during the time that the pressure in said train pipe is greater than atmospheric.

10. In a freight-car air brake system, a train pipe, a pressure reservoir, and a brake cylinder, means operative while atmospheric pressure exists in the train pipe for permitting repeated operation of said brake cylinder by the air in said reservoir, and means for preventing such operation when the pressure existing in said train pipe is greater than atmospheric.

11. In an air brake, in combination, a pressure reservoir, a brake cylinder operatively connected thereto, such connection including two three-way valves, an operating piston for each valve, a cylinder for each piston, a train pipe connected to each of the last named cylinders and also to the supply reservoir, and means for operating one of said three-way valves manually when the pressure in said train pipe is atmospheric.

12. In an air brake, in combination, a pressure reservoir, a pair of proportional chambers, a train pipe connected to said reservoir in supplying relation, a triple valve operatively connecting said proportional chambers together and to said train pipe, means operative upon the connection of said chambers together by said triple valve for applying the brake with a force proportional to the pressure in said chambers, and a manually operated valve adapted to vent said cylinder to the air without discharging air either from said reservoir or from said chambers.

13. In air brakes, in combination, a brake cylinder, a train pipe, and two pressure reservoirs independently connected thereto, a control chamber associated with one of said reservoirs, a triple valve interposed in the connection between said train pipe and said last reservoir and adapted either to vent said control chamber to the atmosphere or to connect it to the corresponding reservoir, a piston located between said control chamber and brake cylinder, and a valve operated by said piston for admitting air from the other reservoir into said brake cylinder.

14. In air brakes, in combination, a brake cylinder, a train pipe, and two pressure reservoirs connected to the train pipe, one connection including a check valve and the other a triple valve, a control chamber connected to said triple valve, a valved connection between said brake cylinder and that reservoir which has the check-valve, a cylinder having one end communicating with said control chamber and the other with said brake cylinder, a piston in said cylinder and operating connections between said piston and the last mentioned valve.

15. In an air brake, in combination, a pressure reservoir, a brake cylinder, and a control cylinder, said brake cylinder being connected to one end of said control cylinder by an open conduit and also connected to said reservoir by a valved conduit, a train pipe connected to said reservoir, a check valve in said connection, a triple valve having one side connected to said train pipe and the other side connected to the other end of said control cylinder, and a piston in said control cylinder operatively connected to the first-mentioned valve.

16. In an air brake, in combination, a pressure supply reservoir, a brake cylinder having separate inlet and outlet valves, the inlet valve communicating with said reservoir, pistons operatively connected to said valves, a cylinder for each piston, a conduit connecting said brake cylinder to one end of the cylinder whose piston controls the inlet valve, a triple valve having its operating side connected to the opposite end of said last mentioned cylinder and having its exhaust port connected to the other of said valve control cylinders, a train pipe connected to said triple valve and also to said reservoir, and a check-valve in the last named connection.

17. In an air brake for railway cars, the combination with a pressure reservoir and a brake cylinder carried by the individual cars, of means carried by each car whereby the brake can be manipulated when the car is disconnected from the locomotive, means carried by the locomotive for operating all the car-brakes, and means for preventing the operation of the first mentioned means when the locomotive is attached to such cars.

In testimony whereof, we hereunto affix our signatures.

GEORGE D. BRECK.
LAWRENCE W. BRECK.
JOHN SCHMAUSS.